United States Patent
Swaminathan

(12) 
(10) Patent No.: US 6,381,658 B1
(45) Date of Patent: Apr. 30, 2002

(54) APPARATUS AND METHOD TO PRECISELY POSITION PACKETS FOR A QUEUE BASED MEMORY CONTROLLER

(75) Inventor: Muthukumar P. Swaminathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,568

(22) Filed: Dec. 29, 1999

(51) Int. Cl.[7] ............................................. G06F 13/372
(52) U.S. Cl. ............................... 710/54; 710/52; 710/6; 710/39; 710/56; 710/58; 710/60; 713/502; 713/400; 370/412
(58) Field of Search .............................. 710/6, 39, 52, 710/54, 56, 58, 60; 370/235, 412; 713/400, 401, 502

(56) References Cited

U.S. PATENT DOCUMENTS 5,325,495 A * 6/1994 McLellan .................... 712/219
5,848,397 A * 12/1998 Marsh et al. .................. 705/14
5,978,813 A * 11/1999 Foltz et al. ................... 707/201
6,075,791 A * 6/2000 Chiussi et al. ................ 370/412
6,091,709 A * 7/2000 Harrison et al. ............. 370/235

OTHER PUBLICATIONS

Direct RMC.d1 Data Sheet, Rambus Advance Information; Jan. 15, 1999; pp. 1–106.
"Rambus® Technology Overview," DL–0040–00, Aug. 23, 1999, Rambus Inc., Mountain View, CA.

* cited by examiner

Primary Examiner—B. James Peikari
(74) Attorney, Agent, or Firm—Blakely, Sokoloff, Taylor & Zafman LLP

(57) ABSTRACT

Disclosed is an apparatus, method, and system to precisely position packets for a queue based memory controller. The memory controller operates with a queue having a plurality of queue positions. A timestamp logic circuit in communication with the memory controller designates scheduled times for each queue position. The memory controller may schedule a packet for a queue position at a scheduled time. The timestamp logic circuit utilizes a plurality of bubble adders to add bubbles to queue positions to adjust the scheduled time for a packet to precisely position the packet.

16 Claims, 4 Drawing Sheets

APPARATUS AND METHOD TO PRECISELY POSITION PACKETS FOR A QUEUE BASED MEMORY CONTROLLER

BACKGROUND OF THE INVENTION

1. Field of the Invention

This invention relates generally to data communications in a computer system. In particular, the invention relates to a timestamp logic circuit which precisely positions packets for a queue based memory controller.

2. Description of Related Art

Computer systems rely heavily upon Dynamic Random Access Memories ("DRAMs") to implement system memories due to their simplicity, affordability and memory density. However, it is increasingly difficult to design memory systems that satisfy the size and performance requirements for modem computer systems using DRAMs connected by conventional bus architectures. To overcome these limitations, a memory subsystem can be constructed using a memory channel architecture. Intelligent memory devices are connected by a narrow, high-speed bus, termed a channel. Packets of information are used to communicate between the memory controller and the memory devices. Direct Rambus™ architecture using a Direct Rambus™ Memory Controller and a Rambus® memory channel is an example of a memory subsystem using a memory channel architecture. The Direct Rambus™ architecture provides for a maximum of 32 Rambus DRAM (RDRAM®) devices on a Rambus® memory channel with a maximum of 128 megabytes (MB) per RDRAM® and 4 gigabytes (GB) on the channel. The Rambus® memory channel operates at data rates up to 800 megahertz (MHz).

The Direct Rambus™ Memory Controller (hereinafter memory controller) is a block of digital logic residing on an Application Specific Integrated Circuit (ASIC) and manages the memory transactions of the Rambus® memory system. The memory controller connects through a Rambus® ASIC Cell (RAC) to the Rambus® memory channel (hereinafter memory channel) and the RDRAMs. The RAC provides an interface between the memory controller and the memory channel to convert the low-swing voltage levels used by the memory channel to the CMOS logic levels internal to the ASIC and vice-versa. The memory controller operates at 100 MHz whereas the memory channel operates at 400 MHz such that there are four memory channel clock cycles (termed a slot) for every memory controller clock cycle. The memory channel operates at 400 MHz but data is transferred on both the rising and falling edges of each clock cycle such that the data transfer rate on to the memory channel is 800 MHz.

The memory controller sends command packets across the memory channel to the RDRAMs for performing read and write transactions. The memory controller has a queue with a plurality of queue positions and includes packet scheduling logic to schedule times for the packets in the various positions of the queue. The memory controller needs to schedule times for packets based upon timing constraints between different packets. The timing constraints require that certain packets be spaced apart from one another in the queue by a specified amount of time to insure the proper operation of the read and write transactions. Presently, in order to schedule a packet, the memory controller must position a packet on the first clock cycle of the slot's four memory channel clock cycles. Unfortunately, oftentimes the next time a packet can be scheduled, immediately after a timing constraint, falls after the first clock cycle of the slot such that the packet must be positioned at the beginning of the next following slot wasting memory channel clock cycles.

SUMMARY OF THE INVENTION

One embodiment of the present invention is a method comprising assigning times for each queue position of a queue. Some of the queue positions have a packet scheduled at a scheduled time. Bubbles are added to the queue positions to adjust the scheduled time for the packet to precisely position the packet.

BRIEF DESCRIPTION OF THE DRAWINGS

Referring now to the drawings in which like reference numbers represent corresponding parts throughout.

DETAILED DESCRIPTION

In the following description various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures and circuits, are shown in block diagram form in order not to obscure the present invention.

Figure 1:
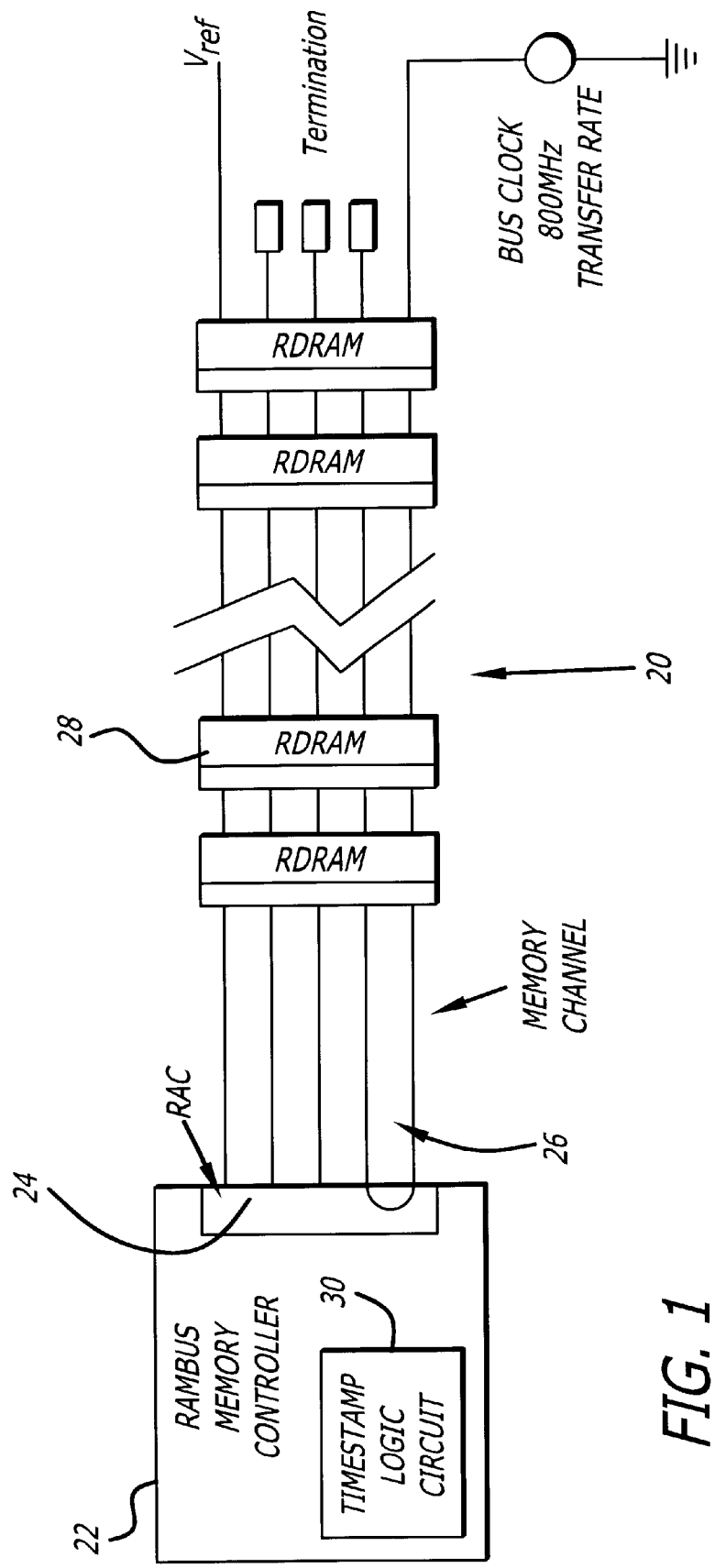
FIG. 1 is a block diagram illustrating a memory subsystem architecture in which an embodiment of the present invention for a timestamp logic circuit can be practiced.

FIG. 1 is a block diagram illustrating a memory subsystem architecture in which an embodiment of the present invention for a timestamp logic circuit can be practiced. FIG. 1 shows a Direct Rambus™ memory subsystem 20 having a Direct Rambus™ Memory Controller 22 connected through a Rambus® ASIC Cell 24 (RAC) to a Rambus® memory channel 26 and a plurality of Rambus® DRAM (RDRAM®) devices 28 (RDRAMs) that the timestamp logic circuit 30 of the present invention can be practiced with. However, it should be appreciated that the timestamp logic circuit 30, as will be described in more detail later, can be utilized with a wide variety of memory subsystem architectures and the Direct Rambus™ memory subsystem architecture is only provided as an example. Additional details regarding the Direct Rambus™ memory subsystem architecture can be found in the "Rambus® Technology Overview," DL-0040-00, Rambus Inc., Aug. 23, 1999.

The Direct Rambus™ Memory Controller 22 (hereinafter memory controller) is a block of digital logic residing on an Application Specific Integrated Circuit (ASIC) and manages the memory transactions of the Direct Rambus™ memory subsystem 20. The memory controller 22 connects through the RAC 24 to the Rambus® memory channel 26 (hereinafter memory channel) and the RDRAMs 28. The RAC 24 provides an interface between the memory controller 22 and the memory channel 26 to convert the low-swing voltage levels used by the memory channel 26 to the CMOS logic levels internal to the ASIC and vice-versa. The memory controller 22 and the timestamp logic circuit 30 operate at 100 MHz whereas the memory channel 26 operates at 400 MHz such that there are four memory channel clock cycles, termed a slot, for every memory controller clock cycle. Each Rambus® memory channel clock cycle is termed an "rclk" referring to the Rambus clock and each memory controller cycle is termed an "hclk" referring to the high frequency clock of the memory controller 22 and the timestamp logic circuit 30. Accordingly, there are four rclks per slot and there is a 4:1 ratio between rclks and hclks.

The memory controller 22 sends packets across the memory channel 26 to the RDRAMs 28 for performing read and write transactions. The memory controller 22 has a queue with a plurality of queue positions and includes packet scheduling logic to schedule times for the packets in the various positions of the queue. The memory controller 22 needs to schedule times for packets based upon timing constraints between different packets. The timing constraints require that certain packets be spaced apart from one another in the queue by a specified amount of time to insure the proper operation of the read and write transactions.

Presently, in order to schedule a packet, the memory controller 22 must position a packet on the first memory clock cycle, i.e. the first rclk, of the slot's four memory channel clock cycles, or rclks. Unfortunately, oftentimes the next time a packet can be scheduled, immediately after a timing constraint, falls after the first rclk of the slot such that the packet must be positioned at the beginning of the next following slot wasting rclks. Accordingly, there has been a desire to allow the memory controller 22 to schedule and precisely position a packet within a slot after the first rclk to conserve rclks.

The timestamp logic circuit 30 of the present invention allows the memory controller 22 to precisely position a packet within a slot. The timestamp logic circuit 30 in communication with the memory controller 22 designates scheduled times for each queue position. Often, the memory controller 22 needs to schedule a packet for a queue position at a scheduled time based upon a timing constraint between packets. The timestamp logic circuit 30 utilizes a plurality of bubble adders to add bubbles to queue positions to adjust the scheduled time for a packet to precisely position the packet within a slot thereby conserving rclks.

The memory controller 22 has a queue including a plurality of queue positions. Each queue position can contain one packet which occupies a time period of 4 rclks. Each queue position can also contain 1–3 bubbles wherein each bubble occupies a time period of 1 rclk. Therefore, each queue position has a variable time period between a minimum of 4 rclks and a maximum of 7 rclks. The combination of bubbles and a packet is termed a "comble." Thus, the queue positions are occupied by combles which have a variable time period of 4 to 7 rclks. The bubbles are prepended to the packet so that if a queue position has a scheduled time of 10, and it has a packet with two bubbles, then the comble starts at time 10 and the packet starts at time 12. In discussing time, unless otherwise noted, time is measured in rclks.

The memory controller 22 contains packet scheduling logic to schedule the start time of a packet. As previously discussed, the memory controller 22 needs to schedule times for packets based upon timing constraints between the packets. For example, assuming a first packet is scheduled at time 9 and a second packet needs to be scheduled with a timing constraint of 10 between the packets, the memory controller 22 can check the designated scheduled times for each queue position obtained from the timestamp logic circuit 30 and schedule the second packet at time 19. If the appropriate slot starts at time 18, the memory controller 22 instructs the timestamp logic circuit 30 to add one bubble to that queue position and the bubble will be prepended to the second packet forming a second comble. In this way, the second comble begins at time 18 with a first bubble on the first rclk of the slot and the second packet starts within the slot at time 19 on the second rclk of the slot. Thus, the second packet is precisely positioned within the slot utilizing bubbles, and the memory controller 22 does not have to schedule the second packet at the next slot, thereby conserving rclks. The operation of the timestamp logic circuit 30 in designating the scheduled times and adding bubbles will be discussed in more detail later.

Figure 2:
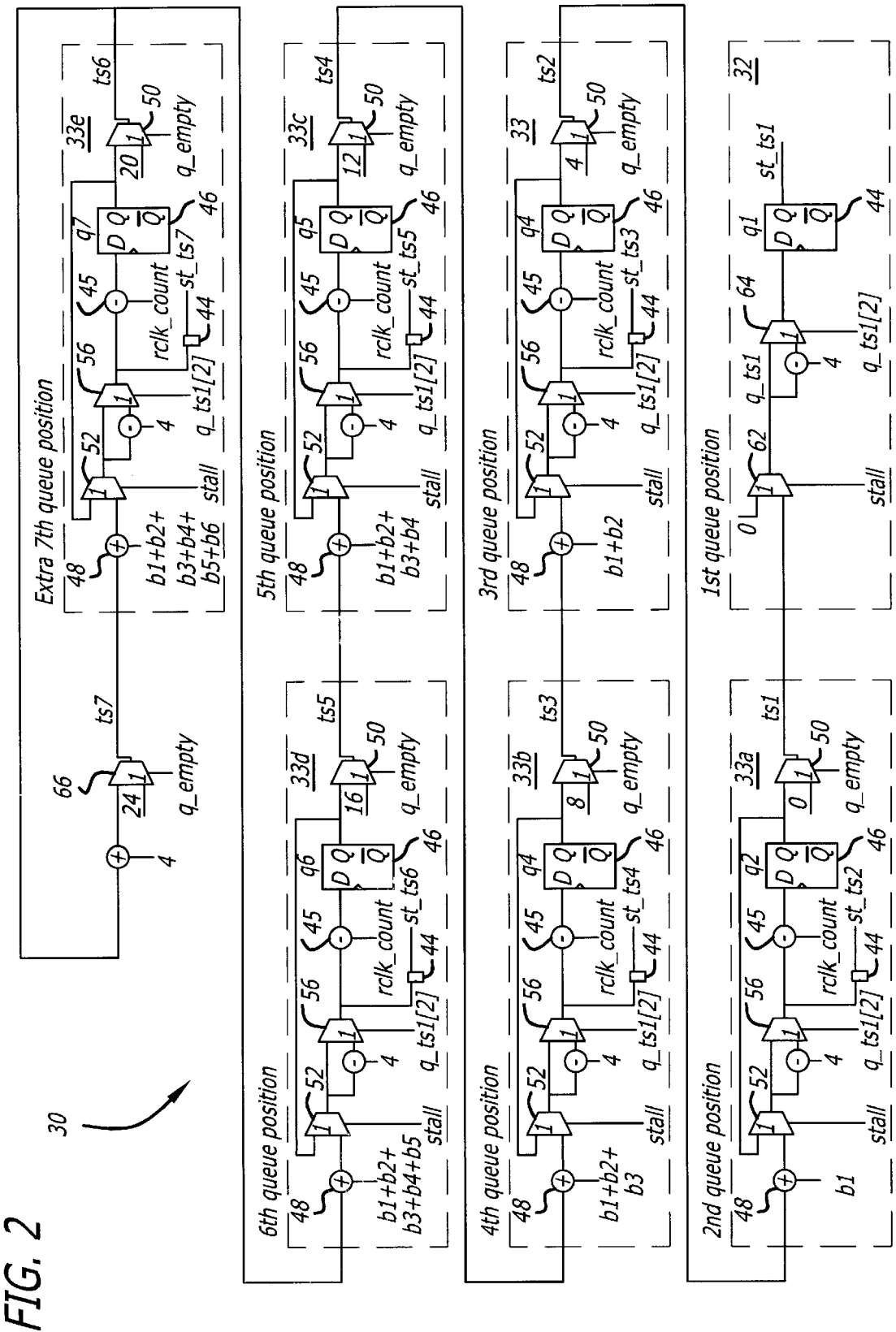
FIG. 2 is a schematic diagram illustrating one embodiment of a timestamp logic circuit according to the present invention.

FIG. 2 is a schematic diagram illustrating the timestamp logic circuit 30 according to one embodiment of the present invention. The timestamp logic circuit 30 includes a plurality of timestamp logic units connected together to form a chain. Each timestamp logic unit corresponds to a queue position and gives the time at which the comble starts for the respective queue position. Each timestamp logic unit also provides an updated schedule time as an input to the next queue position. The timestamp logic circuit 30 shown in FIG. 2 has 7 timestamp logic units and is used for a queue having 6 queue positions: the first timestamp logic unit 32 corresponds to the first queue position, the second timestamp logic unit 33a corresponds to the second queue position, the third timestamp logic unit 33 corresponds to the third queue position, the fourth timestamp logic unit 33b corresponds to the fourth queue position, the fifth timestamp logic unit 33c corresponds to the fifth queue position, the sixth timestamp logic unit 33d corresponds to the sixth queue position, and the seventh timestamp logic unit 33e corresponds to an extra seventh queue position needed to provide an updated schedule time input to the sixth timestamp logic unit 33d. It should be appreciated that the timestamp logic circuit 30 of the present invention can form a queue having any number of queue positions, N queue positions, by utilizing N+1 timestamp logic units.

Timestamp logic units 33–33e for queue positions 2–7 are all standard timestamp logic units including the same basic components whereas the arrangement of components for the first timestamp logic unit 32 for the first queue position differ slightly. With additional reference to FIG. 3, which is a schematic diagram illustrating the third standard timestamp logic unit 33 for the third queue position in detail, the basic components of the standard timestamp logic units will be discussed next. The basic components of the third standard timestamp logic unit 33 for the third queue position are discussed below, and it will be appreciated by those skilled in the art that the basic description and operation of the components of the third standard timestamp logic unit apply to the other standard timestamp logic units 33a–33e for the other various queue positions.

Figure 3:
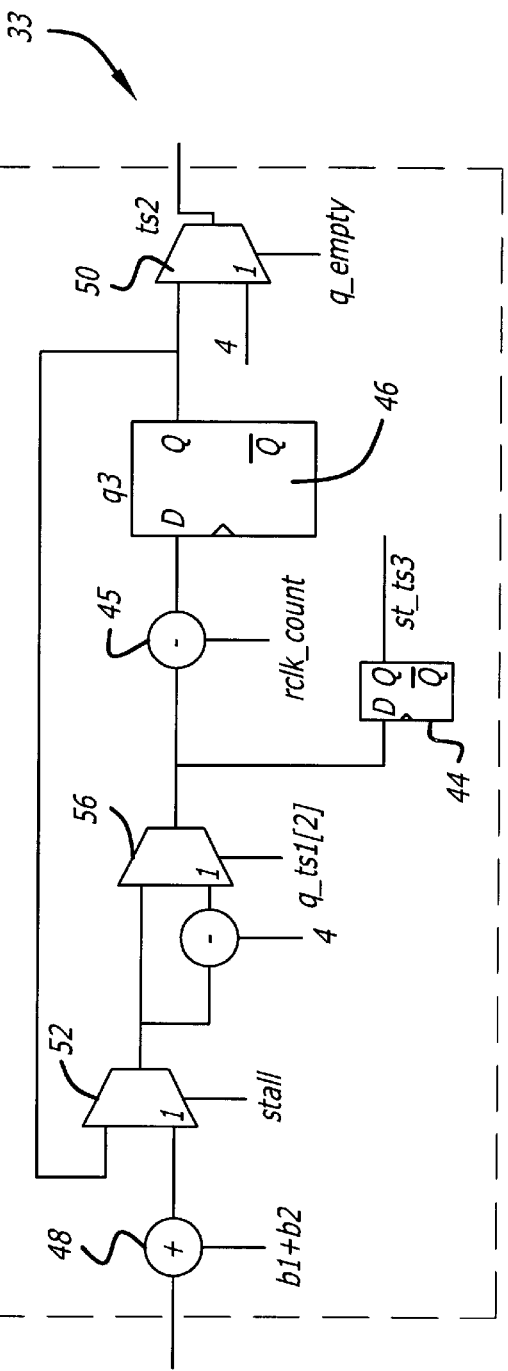
FIG. 3 is a schematic diagram illustrating a timestamp logic unit for the timestamp logic circuit of FIG. 2, in detail, according to one embodiment of the present invention.

As shown in FIG. 3, the third standard timestamp logic unit 33 includes a first storage element 44 which stores the scheduled start time for the third queue position denoted st_ts3. Preferably, the first storage element 44 may be a standard flip-flop. Similarly, as can be seen in FIG. 2, all the other standard timestamp logic units 33a–33e and the first timestamp logic unit 32 have first storage elements 44 for storing the scheduled start time for their respective queue positions as follows: for the seventh extra queue position the scheduled start time is st_ts7, for the sixth queue position the scheduled start time is St_ts6, for the fifth queue position the scheduled start time is st_ts5, for the fourth queue position the scheduled start time is st_ts4, for the second queue position the scheduled start time is st_ts2, and for the first queue position the scheduled start time is st_ts1. However, it should be noted that st_ts7 is used merely for calculation purposes by the memory controller 22. All the st_ts values are fed back to the memory controller 22 which uses this information to schedule packets.

As the queue advances a packet from a queue position N to a queue position N–1, the scheduled time at queue position N needs to be updated. Accordingly, to take into account the advancement of time, the scheduled start time for the Nth queue position, st_ts(N), is decremented utilizing a subtractor 45 to create an updated scheduling time for the next queue position, denoted ts(N). As shown in FIGS. 2 and 3, the queue advances from the third queue position to the second queue position. Accordingly, to take into account the advancement of time, the scheduled start time for the third queue position, st_ts3, is decremented utilizing the subtractor 45 to create an updated scheduling time for the second queue position, denoted ts2. The amount of time decremented is denoted as rclk_count, which is the number of rclks in one hctk. In the present case, the rclk_count is 4.

A second storage element 46 stores and then transmits the updated scheduling time to the next timestamp logic unit as the queue advances. Preferably, the second storage element 46 may be a standard flip-flop. In this case, the second storage element 46 stores the updated scheduling time, ts2, during a first cycle of the queue at the D input and then transmits the updated scheduling time, ts2, at the Q output to the second timestamp logic unit 33a for the second queue position as the queue advances on the next cycle.

Similarly, as can be seen in FIG. 2, all the other standard timestamp logic units 33a–33e have second storage elements 46 for storing and then transmitting the updated scheduling time for the next queue position as the queue advances: for the seventh extra queue position the updated scheduling time transmitted to the sixth queue position is ts6, for the sixth queue position the updated scheduling time transmitted to the fifth queue position is ts5, for the fifth queue position the updated scheduling time transmitted to the fourth queue position is ts4, for the fourth queue position the updated scheduling time transmitted to the third queue position is ts3, and for the second queue position the updated scheduling time transmitted to the first queue position is ts1. All the ts values are also fed back to the memory controller 22 which uses this information to schedule packets.

As shown in FIG. 3, the third standard timestamp logic unit 33 includes a bubble adder 48. As discussed previously, when a packet is scheduled in the queue by the memory controller 22 it may have bubble values associated with it to precisely position the packet within a slot. Therefore, the scheduled times for all queue positions greater than the queue position where the new packet is scheduled, need to be updated by adding the scheduled bubble values to them. This is accomplished by using the bubble adder 48. In the instant case for the third queue position, "b1" corresponds to the bubble values being scheduled at the first queue position and "b2" corresponds to the bubble values being scheduled at the second queue position. Similarly, with reference to FIG. 2, "b3" corresponds to the bubble values being scheduled at the third queue position, "b4" corresponds to the bubble values being scheduled at the fourth queue position, "b5" corresponds to the bubble values being scheduled at the fifth queue position, "b6" corresponds to the bubble values being scheduled at the sixth queue position. As can be seen in FIG. 2, all the other standard timestamp logic units 33a–33e also have a bubble adder 48 for adding the scheduled bubbles.

Further, as shown in FIGS. 2 and 3, the third standard timestamp logic unit 33 also includes a queue empty selector 50 which transmits a predetermined time value for the updated scheduling time, ts2, to the second standard timestamp logic unit 33a for the second queue position when the queue is empty. In this case, the predetermined time value for the second queue position is 4. The predetermined time value that a standard timestamp logic unit is initialized to depends on its position in the queue. Preferably, the queue empty selector 50 may be a standard multiplexer responsive to a q_empty signal. Similarly, as can be seen in FIG. 2, all the other standard timestamp logic units 33a–33e have a queue empty selector 50 initialized to the following predetermined time values, respectively, which serves as a ts(N) input to the next queue position when selected: for the seventh standard timestamp logic unit 33e the queue empty selector is initialized to time value 20 for ts6, for the sixth standard timestamp logic unit 33d the queue empty selector is initialized to time value 16 for ts5, for the fifth standard timestamp logic unit 33c the queue empty selector is initialized to time value 12 for ts4, for the fourth standard timestamp logic unit 33b the queue empty selector is initialized to time value 8 for ts3, and for the second standard timestamp logic unit 33a the queue empty selector is initialized to time value 0 for ts1.

Additionally, as shown in FIG. 3, the third standard timestamp logic unit 33 includes a stall selector 52. When the queue is stalled, the stall selector 52 is activated resulting in the packet remaining in the third standard timestamp logic unit 33 and the third queue position but the scheduled time for the third queue position is decremented by rclk_count as time is still advancing. Preferably, the stall selector 52 may be a standard multiplexer responsive to a stall input signal. When the input signal is set to stall, the scheduled time for the queue position is taken from the same third standard timestamp logic unit 33, and not from the previous standard timestamp logic unit 33b, such that the scheduled time is decremented by rclk_count. Similarly, as shown in FIG. 2, all the other standard timestamp logic units 33a–33e also each have a stall selector 52 such that when the queue is stalled the packets remain in the same respective standard timestamp logic unit and the same respective queue position but the scheduled time for each respective queue position is decremented by rclk_count as time is still advancing.

As shown in FIG. 3, the third standard timestamp logic unit 33 for the third queue position also includes a time subtractor 56 to subtract a predetermined time value from the third standard timestamp logic unit 33 in case the first timestamp logic unit 32 for the first queue position has a scheduled time value greater than 3. The first timestamp logic unit 32 for the first queue position can have a scheduled time value of 0 to 3. The first timestamp logic unit 32 should never have a scheduled time greater than a predetermined scheduled time of 3. However, due to some bubble insertion cases it is possible to have the first timestamp logic unit 32 receive a scheduled time value greater than 3. If this happens, the time subtractor 56 for the third standard timestamp logic unit 33 is activated and a value of 4 is subtracted from the scheduled time of the third standard timestamp logic unit 33. This is done in order to ensure that the scheduled time value reflects the correct starting point in reference to the current rising edge of the hclk. Preferably, the time subtractor 56 may be a multiplexer responsive to an input signal q_ts1 [2] which is a bit indicating that the scheduled time value for the first timestamp logic unit 32 exceeded 3. Similarly, as shown in FIG. 2, all the other standard timestamp logic units 33a–33e each have a time subtractor 56 which subtracts the predetermined time value of 4 from each respective standard timestamp logic unit in the case the first timestamp logic unit 32 has a scheduled time value greater than 3.

As shown in FIG. 2, the first timestamp logic unit 32 utilizes the same basic components as the previously described standard timestamp logic units 33–33e but in a different configuration. The first timestamp logic unit 32 includes the first storage element 44 that stores the updated scheduling time, ts1, and transmits this value as the scheduled time for the first queue position, st_ts1, to the memory controller 22. Preferably, the storage element 44 may be a standard flip-flop. The first timestamp logic unit 32 also includes a stall selector 62. When the queue is stalled, the stall selector 62 is activated resulting in the scheduled time for the first timestamp logic unit 32 and the first queue position being set to 0. Preferably, the stall selector 62 may be a standard multiplexer responsive to a stall input signal. The first timestamp logic unit 32 further includes a time subtractor 64 to subtract a predetermined time value of 4 from the first timestamp logic unit 32 in case the first timestamp logic unit 32 for the first queue position has a scheduled time value greater than 3. Preferably, the time subtractor 64 may be a multiplexer responsive to an input signal q_ts1[2] which is a bit indicating that the scheduled time value for the first timestamp logic unit 32 exceeded 3. Accordingly, the first timestamp logic unit 32 is similar to the previously described standard timestamp logic units 33–33e.

As previously discussed, utilizing the timestamp logic circuit 30 of the present invention a queue having N queue positions can be formed by utilizing N+1 timestamp logic units. The N+1th timestamp logic unit is needed to provide the updated scheduling time to the Nth timestamp logic unit for the Nth queue position. In this case the seventh standard timestamp logic unit 33e shown in FIG. 2 is needed to provide the updated scheduling time, ts6, to the sixth standard timestamp logic unit 33d for the sixth queue position. The input scheduling time ts7 for the seventh standard timestamp logic unit 33e is derived by feeding back the ts6 value and adding a value of 4 to it as seen in FIG. 2. Further, a queue empty selector 66 comprising a standard multiplexer responsive to the q_empty signal is also added before the seventh standard timestamp logic unit 33e. Therefore, when the queue is empty, the queue empty selector 66 is initialized to a time value of 24 which is used as the input scheduling time ts7 for the seventh standard timestamp logic unit 33e. Otherwise, the seventh standard timestamp logic unit 33e is as previously described. By this arrangement, the seventh standard timestamp logic unit 33e provides a derived updated scheduling time, ts6, to the sixth standard timestamp logic unit 33d.

Figure 4:
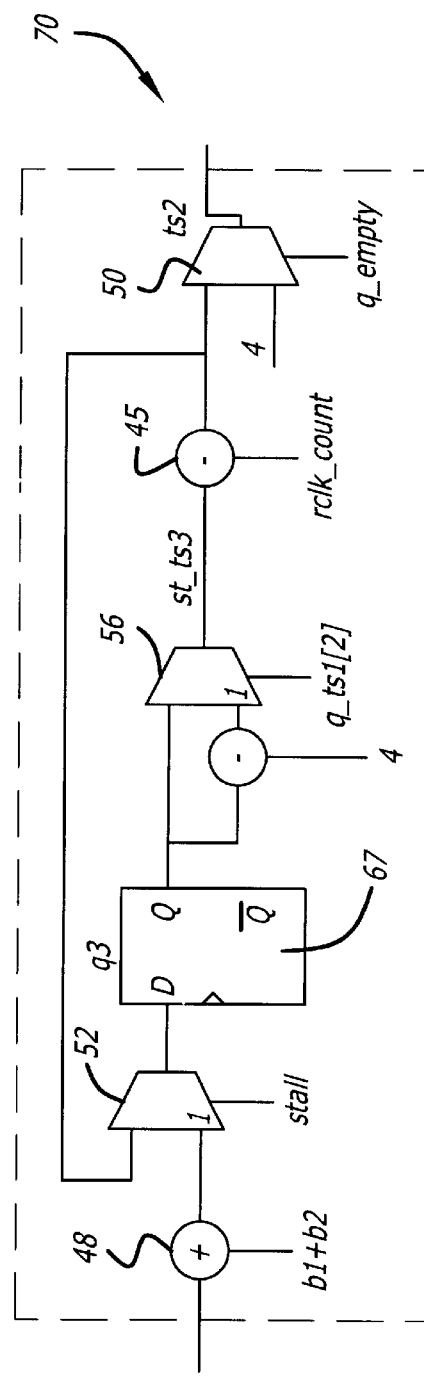
FIG. 4 is a schematic diagram illustrating an alternative embodiment of the timestamp logic unit of FIG. 3.

Additionally, variations can be made to the arrangement of components within the standard timestamp logic units. FIG. 4 is a schematic diagram illustrating an alternative embodiment of the third standard timestamp logic unit 33 of FIG. 3. The alternative embodiment of the third standard timestamp logic unit 70 for the third queue position utilizes the exact same components of the standard timestamp logic units 33–33e of the timestamp logic circuit 30 but slightly rearranged.

As shown in FIG. 4, the alternative third standard timestamp logic unit 70 includes a first storage element 67 which stores the scheduled start time for the third queue position st_ts3. The alternative third standard timestamp logic unit 70 includes the subtractor 45 to account for advancement of time such that the scheduled start time for the third queue position, st_ts3, is decremented by rclk_count to create the updated schedule time, ts2, for the second queue position as the queue advances. The alternative third standard timestamp logic unit 70 also includes the bubble adder 48 for adding bubbles "b1" and "b2." Further, the alternative third standard timestamp logic unit 70 includes the queue empty selector 50, the stall selector 52, and the time subtractor 56. Thus, the alternative third standard timestamp logic unit 70 is similar to the third standard timestamp logic unit 33 of FIG. 3, and its basic form can be utilized to create the other alternative timestamp logic units for various queue positions, respectively, to form an alternative timestamp logic circuit. The only significant difference between the alternative timestamp logic unit 70 and the other standard timestamp logic units 33–33e is that the positions of the components are rearranged.

It will be appreciated by those skilled in the art that the alternative standard timestamp logic unit 70 can be used as the standard timestamp logic unit and can be chained together to form a queue having N queue positions, utilizing N+1 alternative standard timestamp logic units 70. This can be accomplished as is previously described regarding the other standard timestamp logic units 33–33e, and as shown in FIG. 2, to create an alternative timestamp logic circuit.

Figure 5:
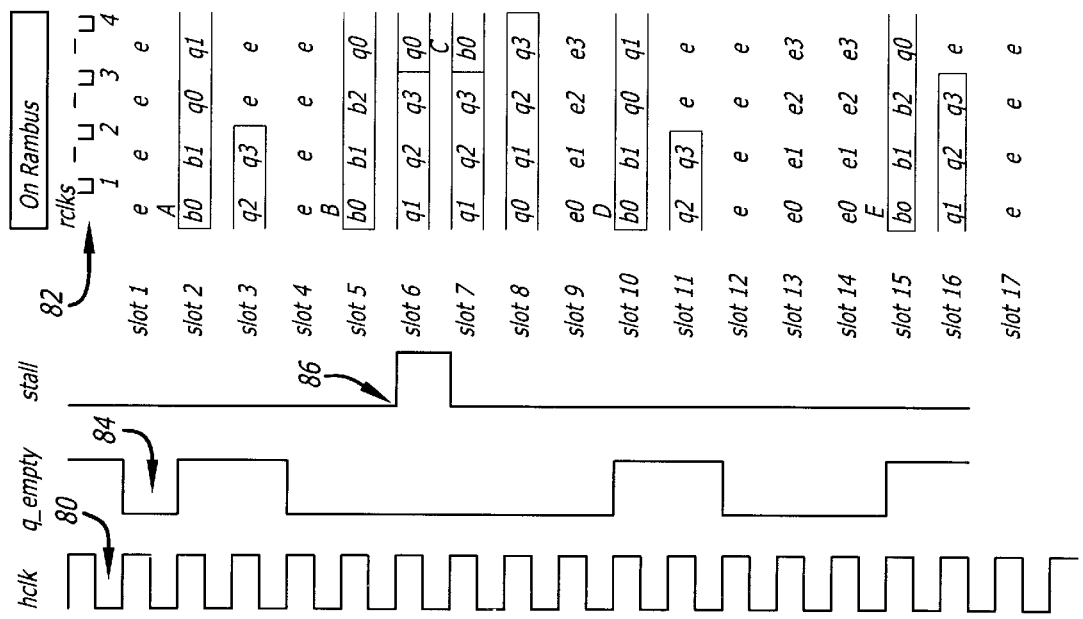
FIG. 5 is a table illustrating scheduled times designated by the timestamp logic circuit of FIG. 2 for the various queue positions and illustrates packets precisely positioned within slots on the Rambus memory channel utilizing bubbles.

The operation of the timestamp logic unit 30 of the present invention as shown in FIG. 2, and constructed as described above, will be discussed with reference to FIG. 5. FIG. 5 is a table illustrating scheduled times designated by the timestamp logic circuit 30 for the various queue positions and illustrates packets precisely positioned within slots on the Rambus memory channel utilizing bubbles.

As can be seen in FIG. 5, each row 1 through 18 represents the state of the timestamp logic circuit 30 in response to a "Cause" of the first column. The column values "st_ts6, st_ts5, st_ts4, st_ts3, st_ts2, and st_ts1" correspond to the scheduled start times for the sixth queue position, the fifth queue position, the fourth queue position, the third queue position, the second queue position, and the first queue position, respectively, of the timestamp logic circuit 30. Each row 1–18 corresponds to the state of the timestamp logic circuit 30 for every hclk cycle as illustrated by the waveform for the hclk 80.

As shown in FIG. 5, for each row 1–18 there is a corresponding "On Rambus" memory channel row denoted as a slot. Each "On Rambus" row corresponds to a slot that is transmitted on to the Rambus memory channel as previously discussed. Each slot contains 4 rclks as illustrated by the rclk waveform 82 during one hclk cycle. Thus, there is a ratio of 4 rclks for every hclk (4 rclks:1 hclk). FIG. 5 illustrates 17 slots denoted slot 1, slot 2, slot 3 . . . slot 17.

The causes of the scheduled start times st_ts6, st_ts5, st_ts4, st_ts3, st_ts2, and st_ts1 of the "Cause" column are defined as follows. The cause "qe" denotes that the scheduled start time values for the various queue positions are derived because the queue is empty. This is also indicated by the q_empty waveform 84 in FIG. 5. The cause "sub" denotes that the scheduled start time values for the various queue positions of the row are derived by subtracting rclk_count from the scheduled start times of the previous queue positions of the previous row, respectively, because the queue is advancing. However, FIG. 5 does not illustrate the derived st_ts7 values for the derived 7th stage queue position. The cause "sub-stall" denotes that scheduled start time values for the various queue positions are derived by subtracting rclk_count from the same queue position because the queue is stalled. This is also indicated by the stall waveform 86 in FIG. 5. The cause "bub-add" means that the scheduled start times for the various queue position are derived by adding bubbles because a new command, a comble (i.e. bubble(s)+packet, as previously discussed), is being scheduled. The bubbles associated with the comble are added to the previous queue positions behind the queue position where the comble is being scheduled. The cause "qe, bub-add" means that bubbles are added on top of the q_empty values to derive the scheduled start times for the various queue positions.

Turning to the "On Rambus" section of FIG. 5, the values in the Rambus memory channel slots will be discussed. The value "e" denotes that queue is empty and that empty values "e" are transmitted on to the memory channel. The values "e0 e1 e2 e3" correspond to an empty slot between actual packets. The values "e0 e1 e2 e3" are different from "e" in that when an empty queue slot lies sandwiched between two actual packets, the empty slot is equal to a packet that has all of its values set to zero and all of these values are transmitted on to the memory channel such that the four values "e0 e1 e2 e3" always go on to the memory channel together. On the other hand, in the case of the queue being empty, the "e" value keeps coming out on to the memory channel as long as the queue remains empty and does not have to occupy a whole slot. The values "b0, b1, b2 . . . " correspond to bubble values being scheduled by the memory controller which are prepended to a packet. For example, "b0" corresponds to one bubble, "b0b1" correspond to two bubbles, "b0b1 b2" corresponds to three bubbles, etc. The values "q0 q1 q2 q3" correspond to packets scheduled by the memory controller. Some of the rows of FIG. 5 will now be discussed to further explain the present invention.

At row 1, the cause is set to "qe" such that the queue is empty. This is also shown by the q_empty waveform 84. Accordingly, "e" values are transmitted in slot 1 on to the memory channel. At row 2, the queue is set to empty and bubbles are added. Bubbles are added at the first queue position denoted on FIG. 5 by "sb2@A" which means that the memory controller has scheduled a packet with 2 bubbles. As shown in slot 2 at A, a first and second bubble (bo b1) are prepended to a packet denoted "q0 q1 q2 q3" which carries over into slot 3. After q3, "e" values corresponding to the queue being empty are transmitted on to the memory channel. At row 3, the scheduled start time value for the various queue positions are derived by subtracting rclk_count, 4, from the scheduled start time values of the previous queue positions of the previous row.

At row 4 the cause is set to "qe" such that the queue is empty. Accordingly, "e" values in slot 4 are transmitted on to the memory channel. In row 5, the queue is set to empty and three different packets with bubbles are scheduled by the memory controller. As previously discussed, the memory controller needs to schedule times for packets based upon timing constraints between the packets. In row 5, a first packet is scheduled by the memory controller with 3 bubbles at the first queue position denoted by "sb3@B" such that the first comble starts at time 0 and the packet at time 3. This is shown in slot 5 where at B three bubbles occur "b0b1 b2" and the first packet "q0 q1 q2 q3" is precisely positioned within slot 5 and starts at the fourth rclk and continues during the first 3 rclks of slot 6.

Assuming a second packet needs to be scheduled with a timing constraint of 9 rclks between the first and second packets, the memory controller can check the designated scheduled times for each queue position set by the timestamp logic circuit 30 and schedule the second packet with one bubble denoted "sb1@C" at the third queue position with a scheduled start time value (st ts3) of 11 for a second comble. Accordingly, the second comble will start 11 rclks from the beginning of the first comble scheduled by "sb3@B." A first bubble b0occurs at C in slot 7 and the second packet "q0 q1 q2 q3" starts at slot 8, 9 rclks away from the beginning of the first packet, such that the timing constraint of 9 between the first and second packets is satisfied. Also, in row 5 a third packet is scheduled at queue position 5 with 2 bubbles denoted "sb2@D."

With additional reference to FIG. 2, the generation of the scheduled start time values st_ts6 . . . st_ts1 for row 5 by the timestamp logic circuit 30 will now be discussed. In row 5, the queue is set empty and packets are scheduled with bubbles as previously described. To accomplish this timing, the timestamp logic circuit 30 in FIG. 2, sets the queue empty selector 66 to the predetermined time value of 24 such that the ts7 value equals 24. Further, timestamp logic unit 33e adds the values of the bubbles (b1=3, b3=1, b5=2) utilizing the bubble adder 48, for a total of 6 bubbles, to the ts7 time value of 24 resulting in a time value of 30. After subtracting the rclk_count value of 4 from this value, via the subtractor 45, the D input for second storage element flip-flop 46, q7, is 26. Queue empty selector 50 of timestamp logic unit 33e is set to the predetermined time value of 20 which becomes the updated scheduling time ts6 inputted into timestamp logic unit 33d. Bubble adder 48 of timestamp logic unit 33d then adds the bubbles for b1, b3, and b5 (totaling 6) to the ts6 value resulting in a scheduled start time value of 26, st_ts6, stored in the first storage element 44, for the 6th queue position shown in row 5 of FIG. 5. After subtracting the rclk_count value of 4 from this value, the D input for second storage element flip-flop 46, q6, is 22. Queue empty selector 50 of timestamp logic unit 33d is set to the predetermined time value of 16 which becomes the updated scheduling time ts5 inputted into the timestamp logic unit 33c .

Bubble adder 48 of the timestamp logic unit 33c then adds the bubbles for b1 and b3 (totaling 4) to the ts5 value of 16 resulting in a scheduled start time value 20, st_ts5, for the 5th queue position shown in row 5. After subtracting the rclk_count value of 4 from this value the D input for second storage element flip-flop 46, q5, is 16. Queue empty selector 50 of timestamp logic unit 33c is set to the predetermined time value of 12 which becomes the updated scheduling time ts4 inputted into timestamp logic unit 33b. Bubble adder 48 of timestamp logic unit 33b then adds the bubbles for b1 and b3 (totaling 4) to the ts4 value of 12 resulting in a scheduled start time value 16, st_ts4, for the 4th queue position shown in row 5. After subtracting the rclk_count value of 4 from this value the D input for second storage element flip-flop 46, q4, is 12. Queue empty selector 50 of timestamp logic unit 33b is set to the predetermined time value of 8 which becomes the updated scheduling time ts3 inputted into the timestamp logic unit 33. Bubble adder 48 of timestamp logic unit 33 then adds the bubbles for b1 (totaling 3) to the ts3 value of 8 resulting in a scheduled start time value 11, st_ts3, for the 3rd queue position shown in row 5. After subtracting the rclk_count value of 4 from this value the D input for second storage element flip-flop 46, q3, is 7. Queue empty selector 50 of timestamp logic unit 33 is set to the predetermined time value of 4 which becomes the updated scheduling time ts2 inputted into the timestamp logic unit 33*a*.

Bubble adder 48 of timestamp logic unit 33*a* then adds the bubble for b1 (totaling 3) to the ts2 value of 4 resulting in a scheduled start time value 7, st_ts2, for the 2nd queue position shown in row 5. After subtracting the rclk_count value of 4 from this value the D input for second storage element flip-flop 46, q2, is 3. Queue empty selector 50 of timestamp logic unit 33*a* is set to the predetermined time value of 0 which becomes the updated scheduling time ts1 inputted into the first timestamp logic unit 32. This results in a scheduled start time value 0, stts1, for the 1 st queue position shown in row 5. Accordingly, in slot 5 at B, three bubbles occur "b0b1 b2" and the packet "q0 q1 q2 q3" starts at the fourth rclk and continues during the first 3 rclks of slot 6.

Continuing with reference to FIG. 2, the generation of the scheduled start time values st_ts6 . . . st_ts1 for row 6 by the timestamp logic circuit 30 will be discussed. In row 6, a command is scheduled at queue position 1 after 3 rclks, with zero bubbles, and the queue is advancing such that the scheduled start time value for the various queue positions are derived from the updated scheduling times ts(N) from the previous queue positions. In timestamp logic unit 33*e* the previous D input of 26 for the second storage element flip-flop 46, q7, becomes the Q output and the updated scheduling time ts6. This ts6 value is fed back along with an added value of 4 to yield the updated scheduling time ts7 value of 30 for the timestamp logic unit 33*e*. After subtracting the rclk_count value of 4 from this value the D input for second storage element flip-flop 46, q7, is 26. Further the updated scheduling time ts6 value of 26 is inputted to the timestamp logic unit 33*d* which results in a st_ts6 scheduled start time value 26 for the 6th queue position as shown in row 6. After subtracting the rclk_count value of 4 from this value the D input for second storage element flip-flop 46, q6, is 22.

In timestamp logic unit 33*d* the previous D input of 22 for the second storage element flip-flop 46, q6, becomes the Q output and the updated scheduling time ts5. The updated scheduling time ts5 value of 22 is inputted to the timestamp logic unit 33*c* which results in a st_ts5 scheduled start time value 22 for the 5th queue position as shown in row 6. After subtracting the rclk_count value of 4 from this value the D input for second storage element flip-flop 46, q5, is 18. In timestamp logic unit 33*c* the previous D input of 16 for the second storage element flip-flop 46, q5, becomes the Q output and the updated scheduling time ts4. The updated scheduling time ts4 value of 16 is inputted to the timestamp logic unit 33*b* which results in a st_ts4 scheduled start time value 16 for the 4th queue position as shown in row 6. After subtracting the rclk_count value of 4 from this value the D input for second storage element flip-flop 46, q4, is 12. In timestamp logic unit 33*b* the previous D input of 12 for the second storage element flip-flop 46, q4, becomes the Q output and the updated scheduling time ts3. The updated scheduling time ts3 value of 12 is inputted to the timestamp logic unit 33 which results in a st_ts3 scheduled time value 12 for the 3rd queue position as shown in row 6. After subtracting the rclk_count value of 4 from this value the D input for second storage element flip-flop 46, q3, is 8.

In timestamp logic unit 33 the previous D input of 7 for the second storage element flip-flop 46, q3, becomes the Q output and the updated scheduling time ts2 value. The updated scheduling time ts2 value of 7 is inputted to the timestamp logic unit 33*a* which results in a st_ts2 scheduled start time value 7 for the 2nd queue position shown in row 6. After subtracting the rclk_count value of 4 from this value the D input for second storage element flip-flop 46, q2, is 3. In timestamp logic unit 33*a* the previous D input of 3 for the second storage element flip-flop 46, q2, becomes the Q output and the updated scheduling time ts1 value. The updated scheduling time ts1 value of 3 is inputted to the first timestamp logic unit 32 which results in a st_ts1 scheduled start time value 3 for the 1st queue position as shown in row 6. Accordingly, in slot 6 the packet "q0 q1 q2 q3" starts at the fourth rclk, after the specified time period of the 3 rclks, and continues during the first 3 rclks of slot 7.

Continuing with reference to FIGS. 2 and 5, the generation of the time values st_ts6 . . . st_ts1 for row 7 by the timestamp logic circuit 30 will be discussed. In row 7 at st_ts1, the scheduled start time 3 of the first queue position corresponds to the second comble originally scheduled in row 6 at the third queue position that had a scheduled start time value (st_ts3) of 11 and one bubble denoted as "sb1@C". This second comble at C now occurs in slot 7. In row 7, the queue is advancing such that the scheduled start time value for the various queue positions are derived from the updated scheduling time, ts(N), from the previous queue positions. In timestamp logic unit 33*e* the previous D input of 26 for the second storage element flip-flop 46, q7, becomes the Q output and the updated scheduling time ts6 value. This ts6 value is fed back along with an added value of 4 to yield the updated scheduling time ts7 value of 30 for the timestamp logic unit 33*e*. After subtracting the rclk_count value of 4 from this value, via the subtractor 45, the D input for second storage element flip-flop 46, q7, is 26. Further the updated scheduling time ts6 value of 26 is inputted to the timestamp logic unit 33*d* which results in a st_ts6 scheduled start time value of 26, stored in the first storage element 44, for the 6th queue position, which is shown in row 7 of FIG. 5. After subtracting the rclk_count value of 4 from this value the D input for second storage element flip-flop 46, q6, is 22.

In timestamp logic unit 33*d* the previous D input of 22 for the second storage element flip-flop 46, q6, becomes the Q output and the updated scheduling time ts5. The updated scheduling time ts5 value of 22 is inputted to the timestamp logic unit 33*c* which results in a st_ts5 scheduled start time value 22 for the 5th queue position shown in row 7. After subtracting the rclk_count value of 4 from this value the D input for second storage element flip-flop 46, q5, is 18. In timestamp logic unit 33*c* the previous D input of 18 for the second storage element flip-flop 46, q5, becomes the Q output and the updated scheduling time ts4 value. The updated scheduling time ts4 value of 18 is inputted to the timestamp logic unit 33*b* which results in a st_ts4 scheduled start time value 18 for the 4th queue position as shown in row 7. After subtracting the rclk_count value of 4 from this value the D input for second storage element flip-flop 46, q4, is 14. In timestamp logic unit 33*b* the previous D input of 12 for the second storage element flip-flop 46, q4, becomes the Q output and the updated scheduling time ts3 value. The updated scheduling time ts3 value of 12 is inputted to the timestamp logic unit 33 which results in a st_ts3 scheduled start time value 12 for the 3rd queue position as shown in row 7. After subtracting the rclk_count value of 4 from this value the D input for second storage element flip-flop 46, q3, is 8.

In timestamp logic unit 33 the previous D input of 8 for the second storage element flip-flop 46, q3, becomes the Q output and the updated scheduling time ts2. The updated scheduling time ts2 value of 8 is inputted to the timestamp logic unit 33a which results in a st_ts2 scheduled start time value 8 for the 2nd queue position as shown in row 7. After subtracting the rclk_count value of 4 from this value the D input for second storage element flip-flop 46, q2, is 4. In timestamp logic unit 33a the previous D input of 3 for the second storage element flip-flop 46, q2, becomes the Q output and the updated scheduling time ts1 value. The updated scheduling time ts1 value of 3 is inputted to the first timestamp logic unit 32 which results in a st_ts1 scheduled start time value 3 for the 1st queue position as shown in row 7. Accordingly, in slot 7 after 3 rclks, the second comble originally scheduled in row 5 at the third queue position with a scheduled time value (st_ts3) of 11 and one bubble denoted as "sb1@C" occurs. At the fourth rclk a bubble b0 occurs and the second packet "q0 q1 q2 q3" occurs in slot 8. As previously discussed, the second comble starts 11 rclks away from the beginning of the first comble scheduled by "sb3@B," which occurred in slot 5, with a first bubble b0 at C in slot 7 and the second packet "q0 q1 q2 q3" starting 9 rclks away from the beginning of the first packet such that the timing constraint of 9 is satisfied. Further, the third comble scheduled in row 5 at queue position 5 with 2 bubbles denoted "sb2@D" occurs at slot 10 at D with two bubbles "b0b1" and the third packet begins on the third rclk of slot 10 and continues to slot 11.

FIG. 5 also illustrates at row 13 a comble with 3 bubbles being scheduled at queue position 3 with a scheduled time of 8 denoted by "sb3@E." The comble occurs in slot 15 where at E three bubbles occur "b0b1 b2" and the packet "q0 q1 q2 q3" starts at the fourth rclk and continues during the first 3 rclks of slot 16.

The details regarding the generation of the scheduled start time values, st_ts6 . . . st_ts1, for the six queue positions utilizing the timestamp logic circuit 30 of the present invention have only been specifically analyzed for rows 5–7 of FIG. 5, as described in detail above, for brevity. These rows were picked as the best examples because they illustrate the different states of the timestamp logic circuit in response to the queue empty condition, the scheduling of combles with bubbles having a time constraint between scheduled packets, and the advancement of the queue. From the previous description of the timestamp logic circuit 30, those skilled in the art can find specific values for the timestamp logic circuit in response to various causes. FIG. 5 provides exemplary values in response to a defined set of causes.

Although the timestamp logic circuit of the present invention has been in reference to a queue comprising 7 timestamp logic units to form a queue having 6 queue positions, it should be appreciated that the present invention can form a queue having any number of N queue positions, by utilizing N+1 timestamp logic units. Furthermore, although the timestamp logic circuit has been described as being utilized with a system in which there is a 4:1 ratio of rclks to hclks, other ratios are also possible such as 3:1, 2:1 etc. Additionally, although the timestamp logic circuit is described as being used with a direct Rambus® memory subsystem architecture, the timestamp logic circuit may be utilized with a wide variety of memory subsystem architecture for precisely positioning packets.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a timestamp logic circuit in communication with a queue based memory controller having a queue with a plurality of queue positions, the timestamp logic circuit designating scheduled times for each queue position, some of the queue positions having a packet scheduled at a scheduled time by the memory controller; and
    a plurality of bubble adders utilized with the timestamp logic circuit to add bubbles to queue positions to adjust the scheduled time for a packet to precisely position the packet;
    wherein the timestamp logic circuit comprises a plurality of chained timestamp logic units, the chained timestamp logic units including a plurality of standard timestamp logic units and a first timestamp logic unit, each standard timestamp logic unit corresponding to a queue position and each standard timestamp logic unit designating a scheduled time for the respective queue position, the first timestamp logic unit corresponding to the first queue position and designating the scheduled time for the first queue position.

2. The apparatus of claim 1 wherein each standard timestamp logic unit includes bubble adder.

3. The apparatus of claim 1 wherein each standard timestamp logic unit includes a first storage element storing the scheduled time for the queue position.

4. The apparatus of claim 1 wherein each standard timestamp logic unit includes a subtractor decrementing time from the scheduled time of the queue position as the queue advances creating an updated scheduling time.

5. The apparatus of claim 4 further comprising a second storage element storing the updated scheduling time.

6. The apparatus of claim 5 wherein the second storage element transmits the updated scheduling time to an adjacent timestamp logic unit as the queue advances.

7. The apparatus of claim 1 wherein each standard timestamp logic unit includes a queue empty selector setting an updated scheduling time to a predetermined time when the queue is empty, the updated scheduling time being transmitted to an adjacent standard timestamp logic unit and an adjacent respective queue position as the queue advances.

8. The apparatus of claim 1 wherein each standard timestamp logic unit includes a stall selector so that if the queue stalls, the stall selector commands packets to remain in the same timestamp logic unit and the same respective queue position.

9. The apparatus of claim 1 wherein the first timestamp logic unit includes a stall selector so that if the queue stalls, the stall selector sets the scheduled time of the first timestamp logic unit and the respective first queue position to zero.

10. The apparatus of claim 1 wherein each timestamp logic unit includes a time subtractor subtracting a predetermined time value from each timestamp logic unit and each respective queue position when the first queue position has a scheduled time greater than a predetermined scheduled time.

11. A memory subsystem comprising:
    a queue based memory controller having a queue with a plurality of queue positions;
    a memory channel coupled to the queue based memory controller;
    a plurality of memory devices coupled to the memory channel;

a timestamp logic circuit coupled to the queue based memory controller, the timestamp logic circuit designating scheduled times for each queue position, some of the queue positions having a packet scheduled at a scheduled time by the memory controller, the packet being transmitted onto the memory channel at a scheduled time to perform an action on a memory device; and a plurality of bubble adders utilized with the timestamp logic circuit to add bubbles to queue positions to precisely position the scheduled time at which the packet is transmitted to the memory bus;

wherein the timestamp logic circuit comprises a plurality of chained timestamp logic units, the chained timestamp logic units including a plurality of standard timestamp logic units and a first timestamp logic unit, each standard timestamp logic unit corresponding to a queue position and each standard timestamp logic unit designating a scheduled time for the respective queue position, the first timestamp logic unit corresponding to the first queue position and designating the scheduled time for the first queue position.

12. The subsystem of claim 11 wherein each standard timestamp logic unit includes a bubble adder.

13. The subsystem of claim 11 wherein each standard timestamp logic unit includes a first storage element storing the scheduled time for the queue position.

14. The subsystem of claim 11 wherein each standard timestamp logic unit includes a subtractor decrementing time from the scheduled time of the queue position as the queue advances creating an updated scheduling time.

15. The subsystem of claim 14 further comprising a second storage element storing the updated scheduling time.

16. The subsystem of claim 15 wherein the second storage element transmits the updated scheduling time to the adjacent timestamp logic unit as the queue advances.

* * * * *

UNITED STATES PATENT AND TRADEMARK OFFICE
CERTIFICATE OF CORRECTION

PATENT NO.   : 6,381,658 B1
DATED        : April 30, 2002
INVENTOR(S)  : Swaminathan It is certified that error appears in the above-identified patent and that said Letters Patent is hereby corrected as shown below:

Column 1,
Line 18, delete "modem", insert -- modern --.

Column 11,
Line 15, delete "stts1", insert -- st_ts1 --.
Line 17, delete "b0b1", insert -- b0 b1 --.

Column 13,
Line 26, delete "b0b1", insert -- b0 b1 --.

Signed and Sealed this

Seventeenth Day of September, 2002

Attest:

Attesting Officer

JAMES E. ROGAN
Director of the United States Patent and Trademark Office